May 13, 1952     A. Y. DODGE     2,596,379
BRAKE
Filed Aug. 29, 1946     3 Sheets-Sheet 1
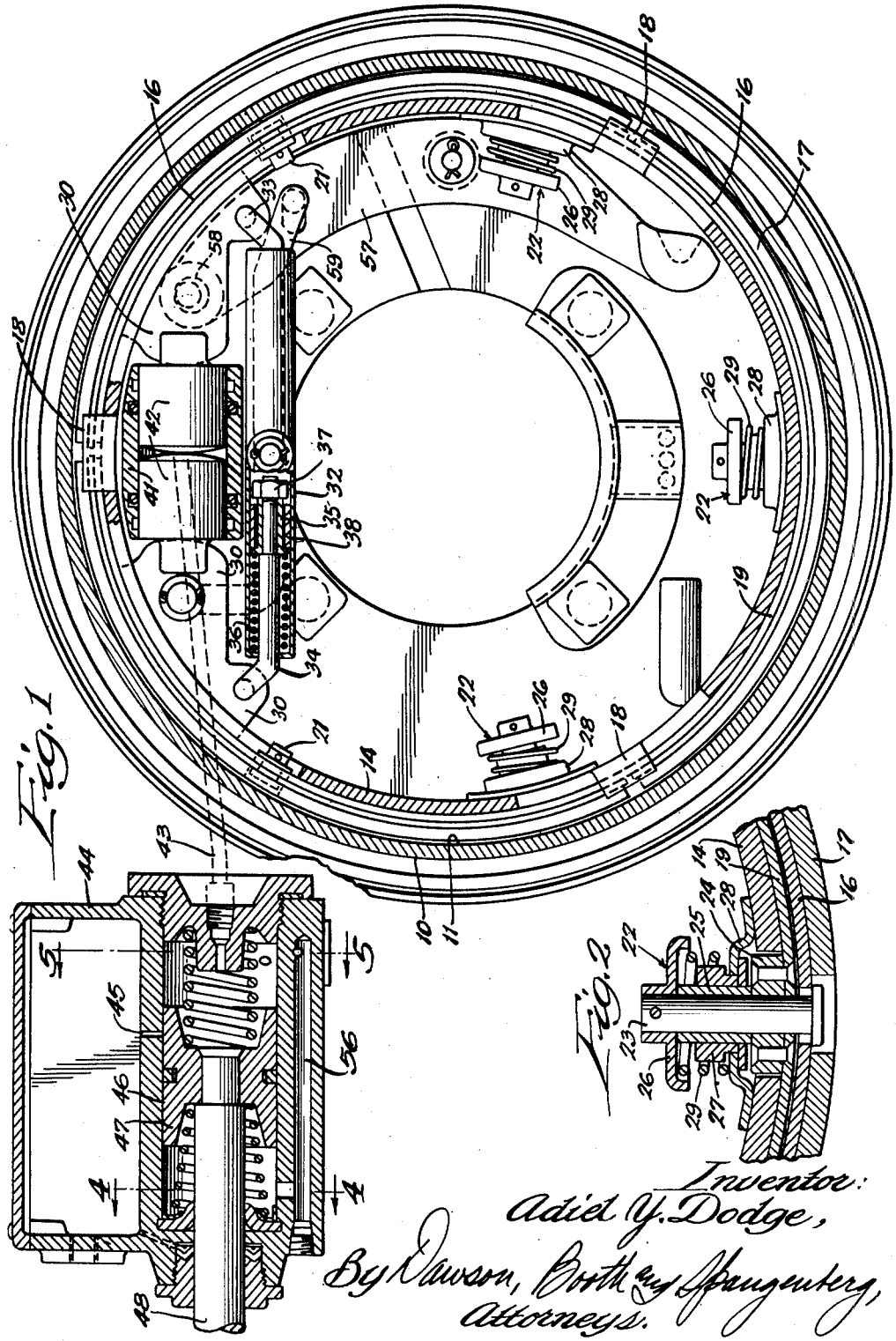
Inventor:
Adiel Y. Dodge,
By Dawson, Booth and Spangenberg,
Attorneys.

May 13, 1952 — A. Y. DODGE — 2,596,379
BRAKE
Filed Aug. 29, 1946 — 3 Sheets-Sheet 2
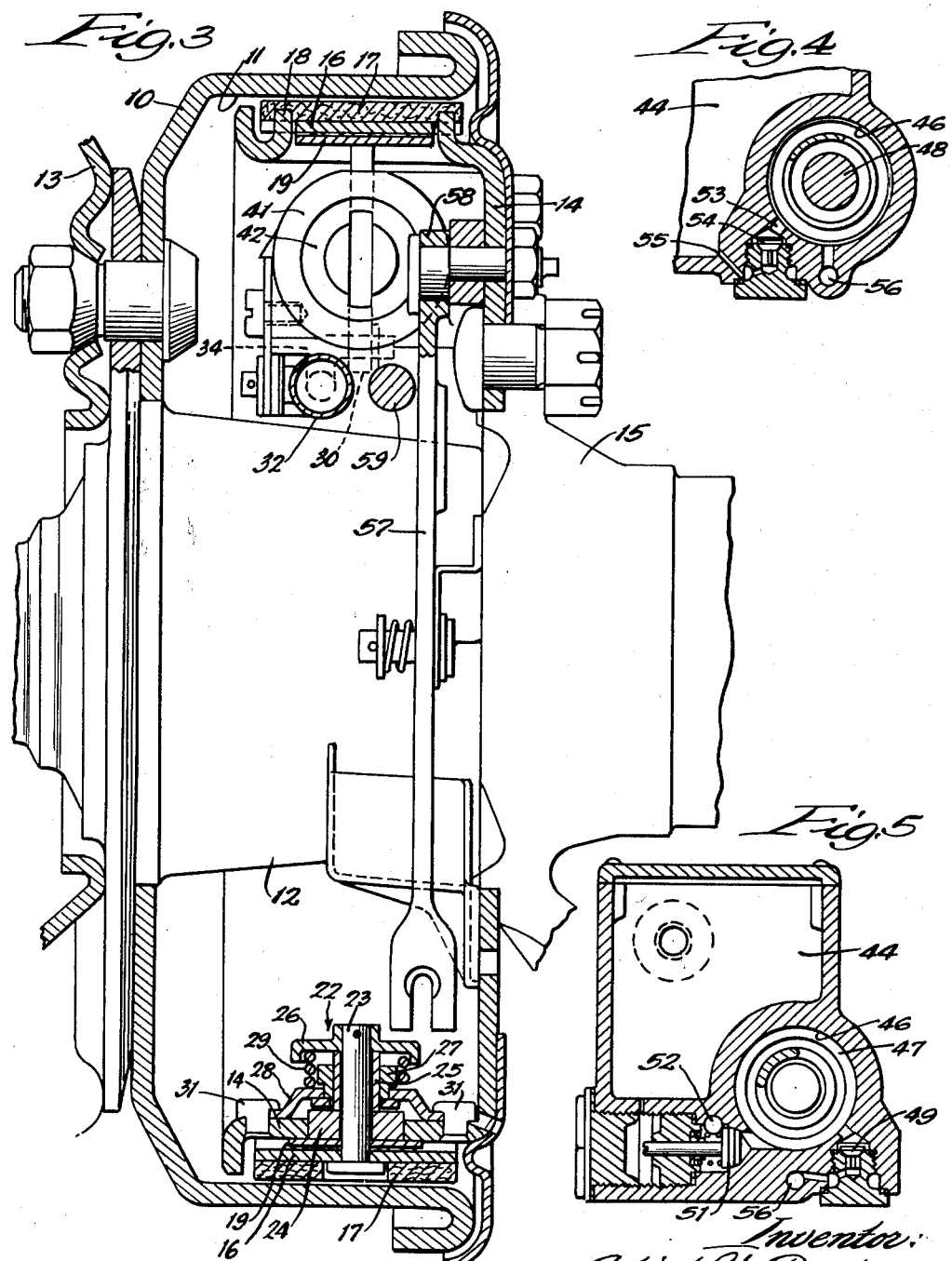

May 13, 1952   A. Y. DODGE   2,596,379
BRAKE
Filed Aug. 29, 1946   3 Sheets-Sheet 3
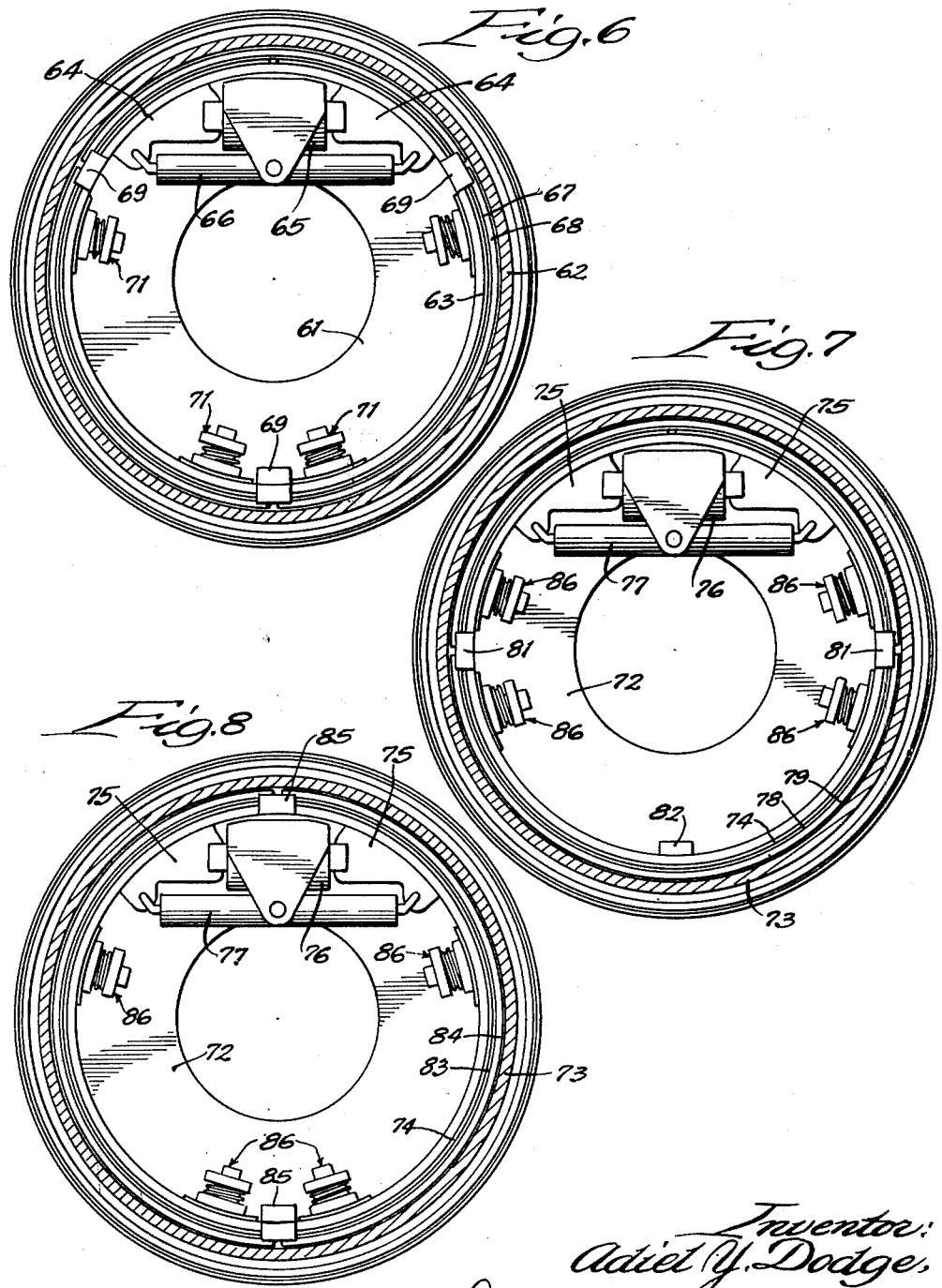

Patented May 13, 1952

2,596,379

UNITED STATES PATENT OFFICE 2,596,379

BRAKE

Adiel Y. Dodge, Rockford, Ill.

Application August 29, 1946, Serial No. 693,642

3 Claims. (Cl. 188—79.5)

This invention relates to brakes and more particularly to brakes of the type used on automotive vehicles.

In automotive brake design it is necessary to provide for operation by a pedal having a travel not to exceed about seven inches at the most, and it is desirable to provide ample clearance between the shoes and the drum. The initial clearance is increased by expansion of the drum due to heat and shoe pressure and by lining wear so that under many conditions much of the pedal travel may be used up in taking up clearance and expansion leaving insufficient pedal to operate the brakes properly.

It has been proposed to overcome this difficulty by the use of a compound master cylinder to provide low hydraulic advantage operation to take up clearance and higher hydraulic advantage operation when the shoes engage the drum. With this type of installation it has been necessary to use ratios varying five to one or more to obtain the necessary shoe movement and a very unpleasant pedal feel has resulted during the initial part of pedal movement.

Another approach to the problem has been the provision of self-adjusting brakes which reset automatically to reduce clearance after a predetermined amount of movement of the brake shoes. These devices cannot be given enough initial clearance to accommodate for maximum drum expansion, which may run in excess of .012 inch, with the result that the brakes may reset to a point when the drums are hot which will produce dragging when the brakes again become cool.

According to one of the objects of the present invention these difficulties are overcome by providing a brake including both compound acting actuating means and a self-adjusting brake structure. The actuating means may have a relatively small ratio change on the order of two or two and one-half to one to produce satisfactory pedal operation and the self-adjusting means may be set to operate only after a relatively large free movement of the shoes sufficient to accommodate for maximum drum expansion. With this construction a highly satisfactory operating brake is provided.

Another object of the invention is to provide a brake in which clearance is automatically adjusted by relative movement of frictionally engaged parts. Such parts have a free movement sufficient to permit brake applications without adjusting clearance and move relative to each other only upon excessive shoe travel resulting from lining wear.

Another object of this invention is to provide automatic adjusters which possess a safety feature in that the action of a slightly eccentric brake drum will reset the brake segments in place, in the event that the automatic adjusters do not function ideally.

Still another object is to provide a brake of the type in which flexible brake segments are moved by a flexible applying band in which self-adjusting return spring devices are provided to maintain clearance substantially constant.

A further object of this invention is to provide a multi-segment brake segment superimposed on an actuating band, such as set forth in my Patent No. 2,206,742 and more particularly to provide means to reduce the friction between the actuating band and the brake segments.

A further object is to provide a brake which produces uniform expansion stresses in the drum, which utilizes maximum circumferential extent of lining, which is mildly self-actuating in both directions, and which may be operated hydraulically, mechanically or pneumatically as desired.

A further object of this invention is to provide a brake which eliminates all local high pressure spots thereby permitting the use of lighter and cheaper drums made of pressed steel, which practice has been discontinued of late due to the tendency of a harder, longer lived brake lining to score steel drums. I find that this has been due chiefly to localized high pressure spots brought about by rigid shoes deforming drum shapes during heavy applications of the brakes.

A further object of this invention is to provide an indicating means to indicate to the driver when his brake lining is becoming worn out.

The above and other objects and advantages of the invention will be more readily apparent from the following description when read in connection with the accompanying drawing, in which:

Figure 1 is a diagrammatic view with parts in section of a brake installation embodying the invention;

Figure 2 is a partial enlarged section through one of the return spring devices;

Figure 3 is an axial section through the brake;

Figures 4 and 5 are partial sectional views on the lines 4—4 and 5—5 of Figure 1, respectively;

Figure 6 is a diagrammatic elevation of a modified three segment brake; and

Figures 7 and 8 are diagrammatic elevations of two types of two segment brakes embodying the invention.

The brake as shown is adapted to be used with a drum 10 having a cylindrical inner braking surface 11 and mounted on a hub 12 carried by a rotating wheel hub. Within the drum a support 14 is mounted carried by a fixed vehicle part such as an axle flange 15. The support 14 is formed with a cylindrical flange portion lying within and spaced from the drum surface 11. The support carries a plurality of brake segments formed by flexible strip sections 16 carrying linings 17 frictionally to engage the drum surface 11. As shown in Figures 1 to 5, three such brake segments are provided. At their ends the brake segments 16 engage abutments 18 formed by turning up ears or lugs out of the support 14 to limit circumferential movement of the segments. The lugs or ears 18 preferably have laterally extending surfaces against which the ends of the segments abut, the segments preferably being slotted to receive the ears thereby to guide the segments. With this construction the segments are held against circumferential movement on the support but are permitted to move radially.

The segments are adapted to be forced into engagement with the drum by a flexible band 19 overlying the support and underlying the segments. The band 19 may be of flexible steel or the like and is split at one point so that it can be spread to move the segments radially. The band and segments may be tied together at spaced points by pins 21 which fit loosely through holes in the segments so that relative circumferential movement is permitted while radial movement is prevented.

At additional spaced points return spring devices are provided indicated generally at 22 to urge the band and segments toward the support and out of engagement with the drum. As best seen in Figure 2, each return spring device comprises a pin 23 fitting loosely in an enlarged slot in the brake segment 16 and extending through an opening in the band 19, and the opening in the band 19 carries a block 24 fitting into an opening in the support 14 to limit circumferential movement of the band while permitting free radial movement thereof. Preferably circumferential movement of the band is substantially prevented by the block 24 in the lower most point shown in Figure 1 opposite the applying means to be described hereinafter, while at other points both radial and circumferential movement of the band are permitted. Above the block 24 the pin 23 carries a split sleeve 25 which is held against axial movement on the pin by a cap 26 and which forms, in effect, a part of the pin. A collar 27 fits frictionally around the sleeve 25 with sufficient frictional force so that it will not be moved by the return springs but so that it can be moved by an applying force substantially larger than the spring force. The collar, as shown, extends slidably through an opening in a plate 28 and is shouldered so that it has a limited free movement relative to the plate and thereafter engages the plate. A return spring 29 acts between the plate 28 and the cap 26 to urge the pin 23 inward. The collar 27 may have a washer secured to its lower end as shown and underlying the plate 28 to limit inward movement of the collar. The plate 28 is slidably attached to the support as shown in Figure 3 by headed screws or rivets 31 whose heads overlie the edges of the plate. I have found that it is necessary when using flexible segment members and flexible band members to employ a sufficient number of adjusting points so that the flexible members will be properly held in shape. I have found it advisable to employ adjustments at intervals of approximately sixty degrees.

An additional return spring device is provided to urge the ends of the band together as shown in Figure 1. A lug or ear 30 is secured adjacent each of the ends of the band 19 and extends through a slot in the support 14. A cylinder 32 is secured by a pin 33 to one of the ears 30 and has a pin 34 slidably extending into the cylinder and secured to the other ear 30. The pin carries a sleeve 35 having a shoulder at one end against which a compression spring 36 bears and held on the pin by a nut 37. The sleeve 35 is slidable through a split collar 38 which fits frictionally within the cylinder 32. Preferably the sleeve 35 is slightly longer than the collar 38 to provide a limited amount of free movement.

The brake as so far described comprises a self-adjusting brake which will maintain a varying clearance in use to compensate for lining wear. When the brake is initially adjusted, the free radial movement provided by the collars 27 and the plates 28 and between sleeve 35 and collar 38 is preferably on the order of .020 to .025 inch—say .020 for further discussion. During brake applications more or less of this free movement is taken up due to drum expansion. The clearance becomes the initial clearance—say .020—less drum expansion after the drum cools. As the lining becomes worn so that additional travel is necessary to bring the segments into engagement with the drum, the pins 23 and sleeves 25 will be forced outward through the collars 27 after the collars have been stopped by engagement with the plates 28. This will reset the collars to a new position on the sleeves 25 to maintain the clearance at the desired value. At the same time the nut 37 will engage the end of the collar 38 to slide it in the cylinder 32 so that it will be moved to a new position to maintain the desired clearance at the ends of the band and the adjacent segment parts. In this way the brake automatically adjusts itself to compensate for lining wear so that the clearance will be maintained within predetermined limits throughout the entire life of the brake. However, during extreme service conditions the frictional stop members 25 and 38 may be moved outwardly an excessive amount in which case they will be returned later by drum pressure and drum eccentricity without harm since the force required to reset them is small compared to the force required to apply the brakes.

The brake may be applied in any desired manner but as shown is adapted to be applied hydraulically. For this purpose a cylinder 41 is secured to the support 14 and slidably carries a pair of pistons 42 which engage the ears 30 respectively. Operating fluid is adapted to be supplied to the cylinder between the inner ends of the pistons through a pipe 43 to separate the pistons thereby to spread the ends of the band. As the band spreads, it will force the segments outward into engagement with the drum to produce a brake application.

According to one of the features of the present invention, the applying means is adapted to be operated by a double acting actuating means shown as a dual master cylinder. The master cylinder, as illustrated, is generally similar to that more particularly described and claimed in my Patent No. 2,340,113, issued January 25, 1944. This construction includes a reservoir 44 to contain a supply of fluid and communicating through a port 45 with a cylinder 46. A piston 47 is slidable in the cylinder and is moved by a piston rod 48 extending through one end of the cylinder for connection with a brake pedal. The opposite end of the cylinder is connected through the usual loading valve to the pipe 43.

Normally the piston occupies a position slightly to the left of that shown in Figure 1 in which the port 45 opens at the forward end of the piston. This port comprises the usual compensating port to return surplus fluid to the reservoir. As the piston is moved to the right, it tends to build up pressure in the forward end of the piston. This pressure is transmitted to a check valve 49 shown in Figure 5 to close the check valve and reacts against a spring loaded valve 51 initially with insufficient force to open the valve. Therefore, the pressure will be transmitted through the pipe 43 to the cylinder 41 to move the pistons 42 with a relatively low mechanical advantage to take up the clearance. When the clearance has been taken up and the brake segments engage the drum, pressure builds up ahead of the piston 47 until it becomes sufficient to unseat the valve 51. This pressure is transmitted through a passage 52 and a port 53 shown in Figure 4 to the rear side of the piston to equalize the pressures on the opposite sides of the piston. During initial travel, the space in the rear of the piston is maintained full of liquid through a check valve 54 connected to the tank through a passage 55. When the pressure is equalized on opposite sides of the piston, the fluid displaced is equivalent to that which is displaced by the piston rod 48 moving into the cylinder in the rear of the piston. Part of the fluid displaced by the piston 47 travels through a passage 52 to the back side of piston 47 and the remainder is forced through the pipe 43 to the cylinder 41. At this time the pistons 42 are moved outward with a higher hydraulic advantage to produce a high brake applying force.

Attention is called to the fact that fluid is trapped in the left hand chamber and that during the return stroke, all of that fluid is positively pumped into the chamber on the right hand side of the master cylinder through the passage 56 and past the check valve 49. Since the effective area of the piston on the right hand side is greater than the area of the piston on the left hand side, the pressure in the brake line assures the necessary force at all times to provide the positive injection of fluid into the right hand chamber. In this way additional fluid is positively pumped or injected into the braking system on every return stroke. When the pedal is allowed to rise to its extremity, the excess fluid passes back into the reservoir through port 45. However, should the pedal be pumped in any position which does not uncover port 45 or uncovers it for a very short period, then in that case additional fluid is pumped into the braking system and thereby provides additional pedal reserve. This occurs as explained above because fluid is positively pumped into the braking system on every little stroke. This has proved to be a feature which reduces the amount of pedal reserve necessary, since pedal reserve may be gained at any time during braking or at any position of the brake pedal by a quick pedal movement.

With the construction shown including both a compound acting operating means and a self-adjusting brake construction the operating means may have a ratio between its initial and its applying ratios of about two or two and one-half to one so that a desirable pedal operation and pedal feel are produced. This is possible because the clearance is maintained within closer limits through the self-adjusting brake construction so that radial movements of the brake shoes never need exceed about .020 less drum thermal contraction. Furthermore, the provision of the double acting operating means enables the brake clearance to be set at a relatively high value so that the self-adjusting features of the brake will not function except when demanded by lining wear. The present invention, therefore, provides a brake having highly desirable operating characteristics throughout the full lining life.

In order to reduce the friction existing between bands 16 and 19, I propose to insert a film of colloidal graphite between these two bands. This may be in the form of a film of graphite and oil or may be in the form of fibre glass cloth impregnated with colloidal graphite or copper gauze impregnated with colloidal graphite. In this way, I have provided a lubricant which runs no risk of getting out of place to reduce the friction of the braking surfaces, but will continue to function under high temperature conditions and remain in its proper place to reduce the friction between the actuating band 19 and the brake segments 16.

I provided a stop to indicate that the lining is reaching the worn out stage by providing a slot in band 19 of sufficient length to abut against pins 21 after the brake has expanded to a predetermined extent. This will prevent relative circumferential movement between bands 19 and 16, thereby reducing the effectiveness of the brake, which in turn will cause an increase in the brake pedal pressure required, thereby indicating progressively that something should be done to improve the brakes. Such a signal becomes more important when automatic adjusters are used and when either my compound master cylinder as set forth in application Serial No. 616,288, now Patent No. 2,507,663, issued May 16, 1950, or my double acting master cylinder, as set forth in co-pending application Serial No. 705,769, filed October 25, 1946, now Patent No. 2,539,572, dated January 30, 1951, is employed.

If desired, the brake may also be operated manually to function as a parking brake. For this purpose a lever 57 is pivoted at one end on an adjustable eccentric pivot 58 to the support 14 and is connected through a link 59 to one of the ears 30. The free end of the lever may be connected to a cable or other mechanical operating means so that when the lever is swung clockwise, as seen in Figure 1, it will expand the operating band 19 to apply the brake. Sufficient lost motion may be provided in the pivot connections of the lever so that the lever will not interfere with application of the brake through the hydraulic actuating means.

Figure 6 illustrates a slightly modified construction similar to that of Figures 1 to 5 and which includes a support or backing plate 61 having an annular flange portion concentric with a drum 62. A flexible band 63 overlies the backing plate and has its ends disconnected. Ears 64 are connected to the band adjacent its separated ends and extend through slots in the support to engage the pistons in a hydraulic cylinder 65 similar to the cylinder 41 of Figures 1 to 5. The ears may also be connected by a return spring device 66 which is similar to the device shown at 32—38 of Figure 1.

Three flexible brake segments overlie the band 63 each of which includes a flexible metallic strip 67 carrying a friction lining 68 to engage the drum. The ends of the segments engage abutments 69 which limit circumferential movement of the segments relative to the support while permitting free radial movement. The abutment 69 opposite the cylinder 65 may also engage in notches or openings in the band 63 to hold it against circumferential movement at that one point only. The band and segments are urged toward the support by return spring devices 71 which may be similar to or identical with the return spring device 22 of Figures 1 to 5.

The principal difference between this construction and that of Figures 1 to 5 is in the relative positions circumferentially of the segments and the band. As shown in Figure 1 the ends of two adjacent segments register with the separated ends of the band. This construction substantially eliminates relative sliding movement between the band and the segments adjacent the separated ends of the band. In the construction of Figure 6 the central portion of one of the segments overlies the separated ends of the band and the ends of adjacent segments register with the point on the band where it is held against circumferential movement on the support. In this construction substantially no sliding occurs between the band and the segments adjacent the bottom abutment 69, but the ends of the band slide over the central part of the top segment. Either construction may be employed as desired.

Figures 7 and 8 illustrate two shoe or two segment brakes embodying the invention and like parts in each of these figures will be indicated by the same reference numeral. As shown, each construction comprises a support or backing plate 72 having an annular cylindrical flange concentric with an annular drum 73. A flexible band 74 overlies the support and has its adjacent ends separated. Ears or lugs 75 are carried by the ends of the band and extend through slots in the support to engage the pistons in a hydraulic cylinder 76 similar to the cylinder 41 of Figure 1. The ears 75 may also be connected by a return spring device 77 similar to the device 32—38 of Figure 1.

In Figure 7 two segments are employed each including a flexible backing strip 78 having a lining 79 secured thereto. The segments engage abutments 81 on the support spaced at diametrically opposite points each lying substantially 90° from the cylinder 76 so that one of the segments extends across the disconnected ends of the band. At a point diametrically opposite the cylinder 76 the band is held against circumferential movement on the support by an abutment or anchor 82 which is constructed to prevent circumferential movement of the band while permitting radial movement.

In the construction of Figure 8 two shoes are employed each including a flexible backing strip 83 having a lining 84 secured thereto. The ends of the segments engage abutments 85 on the support one of which registers circumferentially with the cylinder 76 and the other of which is diametrically opposite thereto. The lower most abutment 85 serves also to limit circumferential movement of the band 74 while permitting radial movement thereof.

In both cases the band and segments are urged inward toward the support by return spring devices 86 which may be identical with the devices 22 of Figures 1 to 5.

The two shoe constructions of Figures 7 and 8 operate in substantially the same manner as the three shoe constructions of Figures 1 to 6 but are somewhat less expensive due to the smaller number of parts required. These constructions are adapted to be operated by double acting master cylinders or the like as explained in connection with Figures 1 to 5 and embody the same self-adjusting features.

While several embodiments of the invention have been shown and described in detail herein, it will be understood that these are illustrative only and are not intended as a definition of the scope of the invention, reference being had for this purpose to the appended claims.

What is claimed is:

1. A return spring device for a brake comprising a pin adapted to be connected to a movable brake element, an annular collar fitting around the pin and frictionally engaging the pin for sliding thereon in either direction, the collar having an annular groove in its periphery, a support having an opening therein through which the collar extends and which is thinner than the width of the groove in the collar to provide for limited free motion between the collar and the support, and a spring engaging the pin and the support to urge the pin in one direction relative to the support.

2. A return spring device for a brake comprising a pin adapted to be connected to a movable brake element, a yieldable friction sleeve surrounding the pin and held against axial movement relative thereto, a collar fitting around the sleeve and having friction contact therewith to slide in either direction thereon in response to a predetermined force, the collar having a peripheral groove therein, a support having an opening therein through which the collar extends and which is thinner than the width of the groove in the collar to provide for limited free movement between the collar and the support and a spring engaging the pin and the support to urge the pin in one direction relative to the support.

3. In combination with a brake including a drum, a backing plate adjacent to the drum, and a friction element movably carried by the backing plate for radial movement toward and away from the drum, an automatic adjuster and return spring device comprising a tension element connected to the friction element, a spring acting on the tension element to pull it and the friction element radially inward away from the drum, a yieldable friction sleeve surrounding the tension element and held against lengthwise movement relative thereto, a collar surrounding and frictionally engaging the sleeve to slide in either direction thereon in response to a predetermined force, the collar having a peripheral groove therein, and a support member carried by the backing plate having an opening therein through which the collar extends and which is thinner than the width of the groove to provide for limited free movement between the collar and the support.

ADIEL Y. DODGE.

REFERENCES CITED

The following references are of record in the file of this patent:

UNITED STATES PATENTS

| Number | Name | Date |
|---|---|---|
| 1,501,335 | White et al. | July 15, 1924 |
| 1,755,830 | Loughead | Apr. 22, 1930 |
| 1,825,555 | Stern | Sept. 29, 1931 |
| 1,991,525 | Thomas | Feb. 19, 1935 |
| 2,160,055 | Brace | May 30, 1939 |
| 2,186,264 | Nachtwey | Jan. 9, 1940 |
| 2,193,385 | Anderson | Mar. 12, 1940 |
| 2,206,742 | Dodge | July 2, 1940 |
| 2,228,576 | Marino | Jan. 14, 1941 |
| 2,229,919 | Dimont | Jan. 28, 1941 |
| 2,244,084 | Saenger | June 3, 1941 |
| 2,251,379 | Van Der Hof | Aug. 5, 1941 |
| 2,279,251 | Scott-Iversen | Apr. 7, 1942 |

FOREIGN PATENTS

| Number | Country | Date |
|---|---|---|
| 735,701 | France | Sept. 6, 1932 |